Sept. 22, 1959

S. LUBKIN 2,905,931

COMPARATOR

Filed Feb. 3, 1955

2 Sheets-Sheet 1

INVENTOR.
SAMUEL LUBKIN
BY S.C. Yuter
ATTORNEY.

Sept. 22, 1959 S. LUBKIN 2,905,931

COMPARATOR

Filed Feb. 3, 1955 2 Sheets-Sheet 2

INVENTOR.
SAMUEL LUBKIN

BY S.C. Yuter

ATTORNEY.

2,905,931

COMPARATOR

Samuel Lubkin, Bayside, N.Y., assignor to Underwood Corporation, New York, N.Y., a corporation of Delaware Application February 3, 1955, Serial No. 485,919

5 Claims. (Cl. 340—174)

This invention relates to information processing and more particularly to apparatus for determining the relationship between items of data represented by electrical pulse signals.

The determination of the relationship between items of information is an important function which is often performed in data processing. For example, it is frequently necessary to compare information represented by numbers to determine whether the numbers are equal or unequal. The device which performs this function is commonly known as a comparator.

The information may be represented by groups of pulses in series with predetermined combinations of pulses and absence of pulses corresponding to particular numbers. The numbers in turn may represent alphabetical information.

Heretofore comparators have included many electrical components which are relatively expensive and bulky and which required periodic replacement.

Therefore an object of the invention is to provide an improved comparator circuit.

Another object of the invention is to provide a relatively inexpensive and compact circuit for comparing data represented by pulses.

A further object of the invention is to provide a comparator circuit which employs electrical components which are rugged and which have a long useful life in order to minimize component replacement.

Briefly, in accordance with the invention a comparator circuit is provided for comparing data from two data sources, the data being represented by the presence and absence of pulses. The comparator circuit comprises two magnetic cores each having an input winding, a sampling winding and an output winding. One input winding is responsive to a pulse from one of the data sources to change the magnetic condition of the associated magnetic core. The other input winding is responsive to a pulse from the other data source to change the magnetic condition of the other magnetic core. The sampling windings are responsive to the subsequent appearance of sample pulses, one sampling pulse occurring after each pair of pulses is compared, to return the magnetic cores to their original condition. The output windings are connected together and arranged so that an output signal is induced when only one of the magnetic cores changes magnetic condition. Thus an output signal is only produced when the data is not the same.

A feature of the invention is that a gating circuit is provided for passing a selected portion of the generated signal so that the output signal passed may be distinguished from extraneous signals produced by the comparator.

An advantage of the invention is that the magnetic core material may have a characteristic curve which departs from the generally rectangular shape required by other magnetic materials which are utilized for other types of circuits since only predetermined portions of the generated signal are utilized. Thus, undesired signals produced by minor changes in the condition of the magnetic cores may be disregarded. The advantage of being able to employ a magnetic core material having a characteristic of this type accrues from the fact that magnetic materials having rectangular characteristics are generally more expensive than those with less rectangular characteristics.

Other objects, features and advantages of the invention will become apparent from consideration of the following detailed description which is accompanied by a drawing, wherein.

Figure 1:
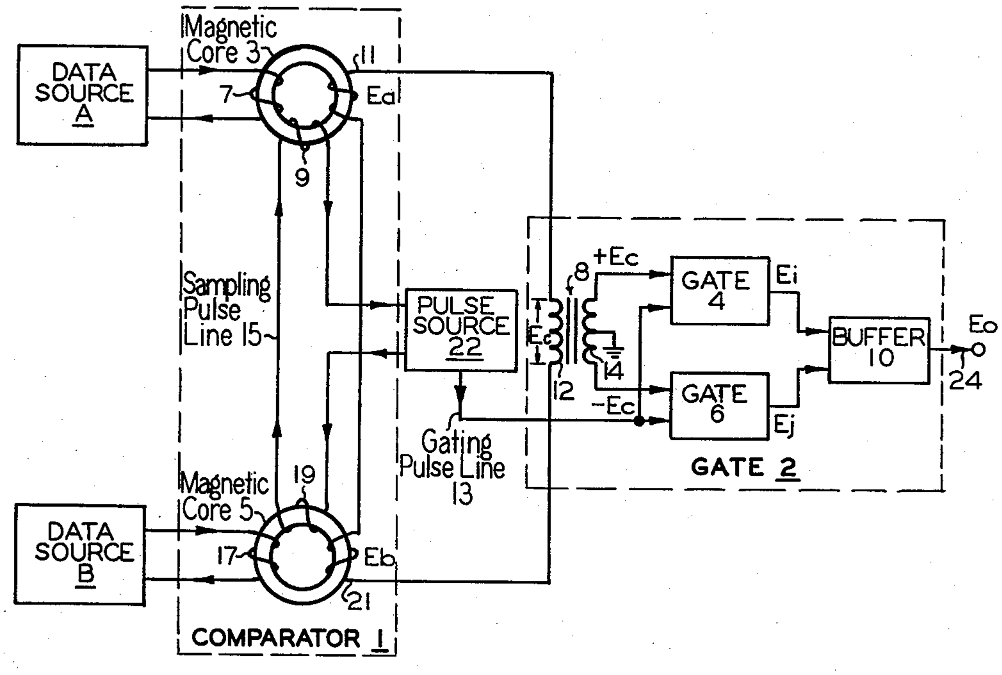
Fig. 1 is a schematic diagram of a comparator circuit for comparing information from two data sources.

The comparator circuit shown in Fig. 1 comprises the comparator 1 and the gate 2 in series.

The comparator 1 includes the magnetic core 3 and the magnetic core 5 and their associated windings. The magnetic core 3 is responsive to information received from the data source A and the magnetic core 5 is responsive to information received from the data source B. As will hereinafter be explained, when the data is not the same a signal is generated which is coupled to the gate 2.

The gate 2, which includes the gate 4, the gate 6, the input transformer 8 with its associated windings 12 and 14 and the buffer 10, functions to produce a positive output signal when either a positive or negative signal is received simultaneously with a gating pulse from the pulse source 22.

The pulse source 22 supplies gating pulses to the gate 2 via the gating pulse line 13 and sampling pulses to the comparator 1 via the sampling pulse line 15. As will be hereinafter indicated, the gating and sampling pulses occur in synchronism.

The magnetic core 3 includes the input winding 7, the sampling winding 9 and the output winding 11. The magnetic core 5 includes the input winding 17, the sampling winding 19 and the output winding 21. The input windings 7 and 17 are connected to the data sources A and B, respectively. The sampling windings 9 and 19 are connected in series and to the pulse source 22 via the sampling pulse line 15. The output windings 11 and 21 are connected in series opposing relationship and are coupled to the gate 2.

Figure 2:
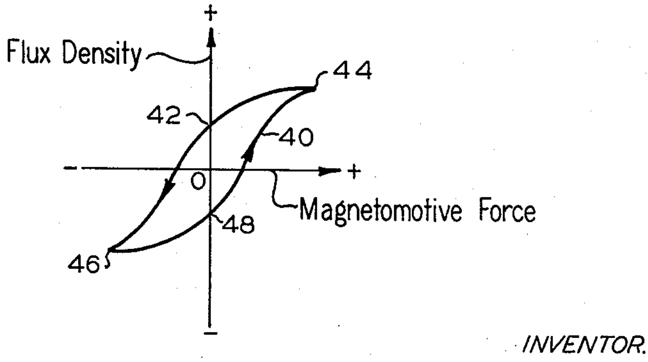
Fig. 2 is a curve illustrating a characteristic of the magnetic core material employed.

The magnetic cores 3 and 5 are constructed from ferrite which has been especially processed to have the hysteresis characteristic shown in Fig. 2. It is not necessary to have a material with a rectangular characteristic since only selected portions of the signal generated by the comparator 1 are passed by the gate 2.

The characteristic curve 40 shown in Fig. 2 is a hysteresis loop of a satisfactory magnetic core material. A magnetic core of this material may have (after it has been initially subject to a magnetomotive force) one of two residual magnetomotive flux directions in the absence of an applied magnetomotive force. It will be assumed that the magnetic core is initially in a reset state, thus having a negative residual flux direction. When a magnetomotive force having a positive direction is applied to the magnetic core, the flux density will increase in a positive direction to the positive saturation flux condition at point 44. After the magnetomotive force is removed, the flux density will return to the positive residual flux point 42. When a magnetomotive force in the opposite or negative direction is applied to the core, the flux density is driven in a negative direction to the negative saturation point 46, and returns to the negative residual flux point 48 after the magnetomotive force is removed.

It should be noted that magnetic cores have a very long useful life and are very rugged as compared with vacuum tubes and crystal diodes.

The gate 2 includes the gates 4 and 6 and the buffer 10 which are well known being commonly employed in many electronic circuits. Each of the gates 4 and 6 functions to pass a positive input signal in the presence of a gating pulse from the pulse source 22. The buffer 10 operates to pass a positive signal received from either of the gates 4 and 6.

The input transformer 8 is connected to receive the output signal from the comparator 1 at the primary winding 12 and couple the output signal via the secondary winding 14 to the gate 4 and the inverse of the output signal to gate 6. Any positive signal passed by the gates 4 and 6 is fed through the buffer 10 and appears at the output terminal 24.

The operation of the comparator circuit shown in Fig. 1 will be described in connection with the current, flux and voltage curves of Fig. 3. For purposes of explanation, it will be assumed that the binary number 1010 (representing the decimal number ten) illustrated on line A of Fig. 3 will be compared with the binary number 1001 (representing the decimal number nine) shown on line B, the data pulses shown on lines A and B being received from the data sources A and B, respectively.

Figure 3:
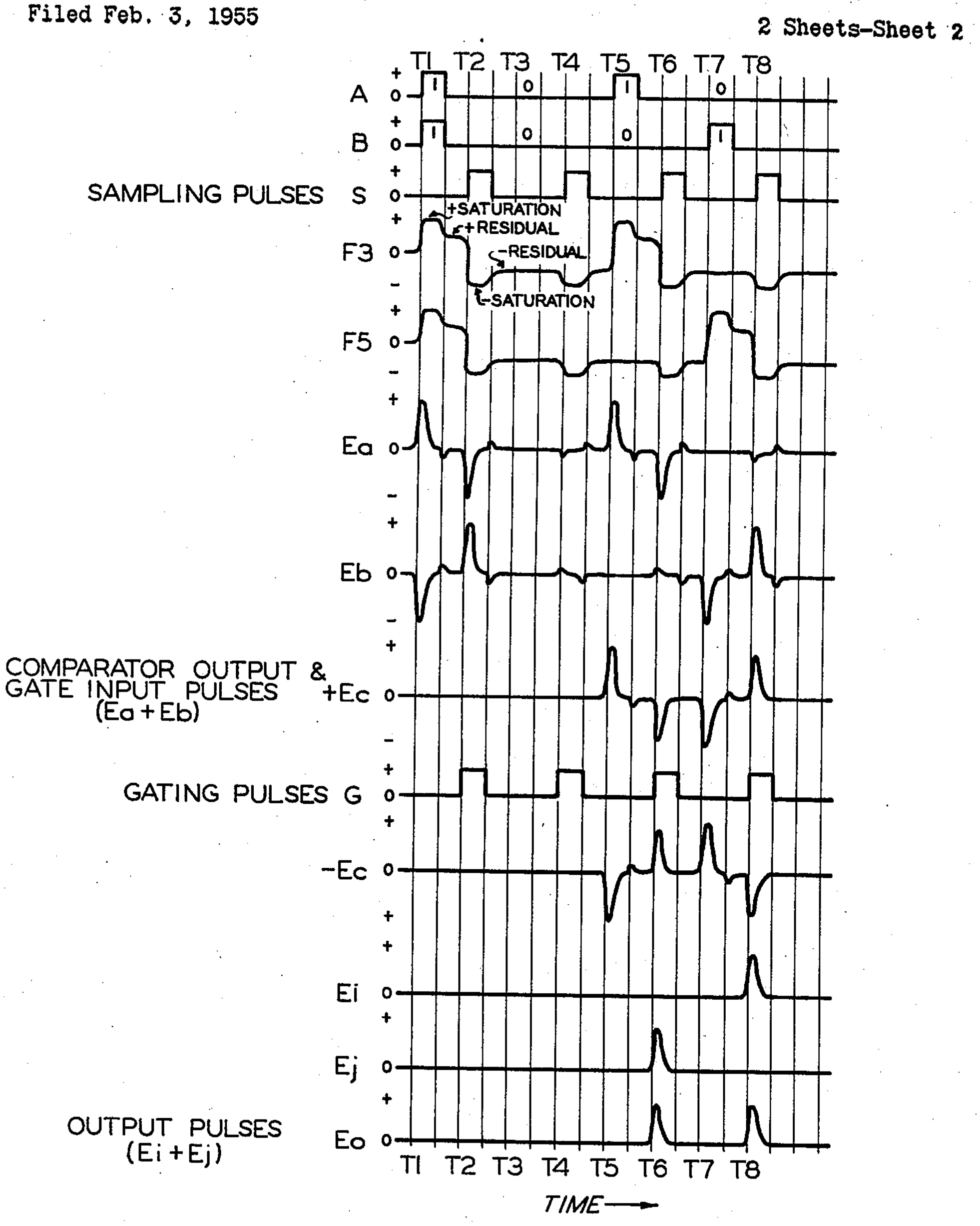
Fig. 3 is a series of curves (somewhat idealized) drawn on a common time scale which illustrate the operation of the comparator circuit shown in Fig. 1.

At time T1 data pulses (which swing from ground to a positive potential level) will appear on the input windings 7 and 17 simultaneously (see Figs. 1 and 3). The input windings 7 and 17 are wound such that a positive (clockwise) magnetomotive force will be induced in each of the magnetic cores 3 and 5 when a data pulse is present. Thus at time T1 the negative condition of each of the magnetic cores 3 and 5 changes to the saturated condition and thereafter returns to the residual condition as is shown on lines F3 and F5, respectively.

At time T2 a sampling pulse (which swings from ground to a positive potential level) is received by the sampling pulse windings 9 and 19 which are wound such that the magnetomotive force induced resets the magnetic cores 3 and 5 by producing a negative (counterclockwise) magnetomotive force.

It should be noted that the flux conditions illustrated on lines F3 and F5 change from zero to a positive flux condition and then are returned to the negative flux condition when the magnetic cores 3 and 5 are reset. However, during operation the magnetic conditions of the magnetic cores 3 and 5 will be negative after the receipt of a sampling pulse and therefore negative at the beginning of each comparison. Thus, when the term "original magnetic condition" is used what is meant is the condition of the magnetic cores after being reset. In the illustrated case the original magnetic condition corresponds to a negative flux condition. However, the invention is equally operative if the original magnetic condition is positive.

At time T1 when both of the magnetic cores 3 and 5 change magnetic condition, a positive voltage E*a* is induced across the ouput winding 11 and a negative voltage E*b* is generated across the output winding 21. The reason for this is that when the magnetic condition of one of the magnetic cores changes, a voltage is produced across the associated output winding which tends to counteract the direction of the flux change. Thus when the magnetic core 3 changes to the positive flux condition a positive voltage is developed across the output winding 11 due to the direction of the winding. However, when the magnetic core 5 changes to the positive flux condition a negative voltage is developed across the output winding 21 since the output winding 21 is wound in an opposite direction than that of the output winding 11. However, at time T1 when both of the magnetic cores 3 and 5 are set, equal and opposite voltages are generated and since the output windings 11 and 21 are in series opposing relationship, the sum of the voltages produced is substantially zero as illustrated on line E*c* which represents the sum of the output voltages produced at the output windings 11 and 21. Similarly at time T2 when both of the magnetic cores 3 and 5 are reset the negative voltage induced at the output winding 11 is counterbalanced by the positive voltage produced at the output winding 21.

In summary when pulses are received simultaneously from the data sources A and B no signal is generated by the comparator 1 (see lines A, B and E*c*) and therefore no signal is passed by the gate 2 (see line E*o*).

At time T3 the data sources A and B do not transmit any pulses. Therefore, the magnetic conditions of the magnetic cores 3 and 5 remain substantially the same as is shown on lines F3 and F5, and no signal is generated by the comparator 1. Consequently when a sampling pulse is received at time T4 the only effect is to drive the magnetic cores 3 and 5 to a more negative magnetic condition since they are already in the reset condition. It should be noted that the relatively small signals produced at times T3 and T4 (see lines E*a* and E*b*) oppose each other.

Therefore, when data pulses are simultaneously absent (at time T3) the comparator 1 does not generate a signal (see lines A, B and E*c*) and no signal appears at the output terminal 24 (see line E*o*).

At time T5, a pulse is received from the data source A but no pulse is received from the data source B. Therefore, a positive pulse (see line E*a*) is generated at the output winding 11 and a corresponding signal is not generated at the output winding 21 so that a positive output pulse (see line E*c*) is transmitted from the comparator 1 to the gate 2. However, as will hereinafter be explained the positive pulse is blocked at the gate 2 since at time T5 a gating pulse (see line G) is not present.

At time T6, when a sampling pulse is fed to the comparator 1 the magnetic core 3 is reset and the comparator 1 generates a negative output pulse (see line E*c*) which will occur in synchronism with a gating pulse (see line G) and be passed by the gate 2 to appear as a positive output pulse at the output terminal 24 as is shown on line E*o*. When the gate 2 receives the comparator output signal it is coupled via the transformer 8 to the gate 4, and the inverse signal (see line −E*c*) is fed to gate 6. since the inverse signal is positive when the gating pulse is present, the gate 6 will pass the signal (see line E*j*) which will appear at the output terminal 24 (see line E*o*) at time T6. Gate 4 will not pass the negative signal present (see lines E*c* and E*i*).

In a similar manner at times T7 and T8 due to the fact that a pulse is transmitted by the data source B in the absence of a pulse from the data source A, comparator 1 generates two pulses. The first pulse, as shown on line E*c*, is negative and the second pulse which occurs at time T8 is positive. The pulse occurring at time T8 is passed by the gate 2 as shown on line E*o* since a positive signal (see line E*c*) is present simultaneously with gating signal (see line G) at gate 4 which passes the signal (see line E*i*).

In summary, the comparator circuit illustrated in Fig. 1 functions to generate a pulse when a pulse is present at one magnetic core and simultaneously absent at the other, but no pulse is generated when pulses are simultaneously present or absent. Further, since the gate 2 of the comparator circuit is only responsive to pulses generated at predetermined times extraneous signals produced by the comparator 1 are disregarded.

Thus, in accordance with the invention a comparator circuit for comparing data represented by the presence and absence of pulses has been provided which is relatively inexpensive, compact and employs electrical components (magnetic cores) which are rugged and which have a long useful life.

Further, inexpensive magnetic materials may be employed for the magnetic core material since generally rectangular hysteresis characteristics are not required.

There will now be obvious to those skilled in the art many modifications and variations utilizing the principles set forth and realizing many or all of the objects and advantages but which do not depart essentially from the spirit of the invention.

What is claimed is:

1. A comparator for comparing data from first and second data sources, said data being represented by the presence and absence of pulses, said comparator comprising a first magnetic core in a reset magnetic condition, a second magnetic core in a reset magnetic condition, each of said magnetic cores having an input winding, a sampling winding and an output winding, said input winding of said first magnetic core being responsive to a pulse from said first data source to change the magnetic condition of said first magnetic core to a set condition, said input winding of said second magnetic core being responsive to a pulse from said second data source to change the magnetic condition of said second magnetic core to a set condition, a sampling pulse source, said sample windings being responsive to the subsequent appearance of a sample pulse to return said magnetic cores to the reset magnetic condition, one end of each of said output windings being connected together, a transformer having a primary winding and a center tapped secondary winding, each end of said primary winding being connected to the other end of one of said output windings, gating means, said gating means being coupled to the ends of said center tapped secondary windings, and said gating means being responsive to said sample pulse to permit the passing of pulses of one polarity from said transformer only during the occurrence of said sampling pulse.

2. A comparator for comparing data from two data sources, said data being represented by the presence and absence of pulses, said comparator comprising a first magnetic core having an input winding, a sampling winding and an output winding, said input winding of said first magnetic core being responsive to a pulse from one of said data sources to change the magnetic condition of said first magnetic core from a first condition to a second condition, a second magnetic core having an input winding, a sampling winding and an output winding, said input winding of said second magnetic core being responsive to a pulse from the other of said data sources to change the magnetic condition of said second magnetic core from a first condition to a second condition, a source of sampling pulses, said sampling windings being responsive to a sampling pulse to return the magnetic condition of each of said magnetic cores to the associated first magnetic condition, one end of each of said output windings being connected together, a transformer having a primary winding and a center tapped secondary winding, each end of said primary winding being connected to one of each of the other ends of said output windings, first and second gating means, the input of said first gating means being connected to one end of said secondary windings, the input of said second gating means being connected to the other end of said secondary winding and said gating means being responsive to said sampling pulses such that said gating means passes unidirectional signals from said transformer only during the occurrence of said sampling pulses.

3. Apparatus for comparing data signals from first and second data sources comprising a first magnetic element settable to one magnetic condition by data signals from said first data source, a second magnetic element settable to said one magnetic condition by data signals from said second data source, means common to said two magnetic elements to reset said elements to a second magnetic condition, an output device for each magnetic element to generate a signal when its magnetic element is changed from either condition to the other, means connecting said output devices in signal opposition whereby an output signal will be generated only when the magnetic condition of one of said magnetic elements is changed without a corresponding change in the condition of the other, a source of resetting pulses connected to said common resetting means to control reset of both of said magnetic elements to said second condition and a gating device controlled by the reset signals of said pulse source and by the output signal of said connecting means to pass a signal when only one of said magnetic elements is reset to said second magnetic condition.

4. A comparator for comparing data from a first and a second data source, said data being represented by the presence and absence of pulses, said comparator comprising a pair of magnetic cores having a substantial remanence in either direction of magnetization, each core having an input winding, a resetting winding and only one output winding, means connecting the first data source to one of said input windings and the second data source to the other of said input windings, application of a pulse from a data source acting to magnetize the associated core in one direction, a resetting pulse source connected to said resetting windings to set both said cores to an opposite direction of magnetization, a connection between one terminal of one output winding and the corresponding terminal of the other output winding, an output device connected to the other terminals of said output windings whereby said output device will produce an appreciable output signal when the direction of magnetization of either of said cores is changed without a corresponding change in the other core, and a gating device controlled by the pulses from said resetting pulse source and said output signals to pass an output signal only when said cores are reset to said opposite direction of magnetization.

5. A comparator for comparing data represented by the presence and absence of pulses in signals received from a first and a second data source, said comparator comprising a pair of magnetic core members having substantial residual magnetism and settable with said residual magnetism in a first or a second orientation, a first, a second, and a third coil winding on each of said cores, means connecting one of said first windings to said first data source and the other first winding to said second data source whereby a pulse in said signal from a data source will set the residual magnetism in the associated core to a first orientation, a resetting pulse source connected to said second windings on said cores to reset the residual magnetism of both said cores to said second orientation, a conductor connecting together a terminal of each of said third windings, a transformer having its primary connected to the remaining terminals of said third windings, said third windings, said conductor and said transformer being so connected that a simultaneous resetting of both of said cores by said resetting pulse source will generate no output from said transformer, and a gating device connected to the secondary of said transformer and to said resetting pulse source to produce an output signal if only one of said cores is reset to said second orientation of residual magnetism by said resetting pulse source.

References Cited in the file of this patent

UNITED STATES PATENTS

| | | |
|---|---|---|
| 2,695,993 | Haynes | Nov. 30, 1954 |
| 2,719,964 | McGuigan | Oct. 4, 1955 |
| 2,729,807 | Paivinen | Jan. 3, 1956 |
| 2,729,808 | Auerbach | Jan. 3, 1956 |